(12) United States Patent
Marimuthu (10) Patent No.: US 9,189,317 B1
(45) Date of Patent: Nov. 17, 2015

(54) SOFTWARE SUSTAINING SYSTEM

(75) Inventor: Venkadesan Marimuthu, Tamil Nadu (IN)

(73) Assignee: Extreme Networks, Inc., San Jose, CA (US)

( * ) Notice: Subject to any disclaimer, the term of this patent is extended or adjusted under 35 U.S.C. 154(b) by 330 days.

(21) Appl. No.: 13/050,808

(22) Filed: Mar. 17, 2011

(51) Int. Cl.
| G06F 9/44 | (2006.01) |
| G06F 11/00 | (2006.01) |
| G06F 11/07 | (2006.01) |
| G06F 11/30 | (2006.01) |
| G06F 11/36 | (2006.01) |
| H04L 12/24 | (2006.01) |

(52) U.S. Cl.
CPC ........ *G06F 11/0778* (2013.01); *G06F 11/3065* (2013.01); *G06F 11/366* (2013.01); *G06F 11/079* (2013.01); *H04L 41/0631* (2013.01)

(58) Field of Classification Search
None
See application file for complete search history.

(56) References Cited

U.S. PATENT DOCUMENTS

| 6,961,874 B2 * | 11/2005 | Lodrige | 714/38.13 |
| 7,100,085 B2 * | 8/2006 | Miller | 714/26 |
| 7,263,632 B2 * | 8/2007 | Ritz et al. | 714/25 |
| 7,389,444 B2 * | 6/2008 | Ma et al. | 714/26 |
| 8,086,909 B1 * | 12/2011 | Liu et al. | 714/49 |
| 2004/0225381 A1 * | 11/2004 | Ritz et al. | 700/26 |
| 2005/0015678 A1 * | 1/2005 | Miller | 714/38 |
| 2009/0106327 A1 * | 4/2009 | Dilman et al. | 707/202 |
| 2012/0066547 A1 * | 3/2012 | Gilbert et al. | 714/26 |

OTHER PUBLICATIONS

Brodie, M., et al., "Quickly Finding Known Software Problems via Automated Symptom Matching" Second International Conf. on Autonomic Computing [online], 2005 [retrieved Jun. 5, 2015], Retrieved From Internet: <URL:http://ieeexplore.ieee.org/xpls/abs_all.jsp?arnumber=1498056&tag=1>, pp. 1-10.*

Register, M., et al., "CANASTA: The Crash Analysis Troubleshooting Assistant", Proceedings of the $3^{rd}$ Conf. on Innovative Applications of Artificial Intelligence [online], 1991 [retrieved Jun. 6, 2015], Retrieved from Internet: <URL:http://www.aaai.org/Papers/IAAI/1991/IAAI91-013.pdf>, pp. 195-212.*

\* cited by examiner

*Primary Examiner* — Todd Aguilera
(74) *Attorney, Agent, or Firm* — Blakely Sokoloff Taylor & Zafman LLP (57) ABSTRACT

A method comprising detecting a problem with a software product, capturing debugging information corresponding to the detected problem, searching for the detected problem in a repository of a set of known issues corresponding to the software product to identify a root cause of the detected problem. If the detected problem is a known issue in the set of known issues corresponding to the software product, automatically applying a corresponding solution to the detected problem. If the detected problem is not a known issue in the set of known issues corresponding to the software product, analyzing the user input describing an occurrence of the problem with the software product, as well as the captured debugging information. Based on the analysis, the repository of the set of known issues is updated to include the detected problem as a new known issue and a corresponding solution to the detected problem.

20 Claims, 3 Drawing Sheets

FIG. 1

| Problem ID | Description | Context | weight 230 |
|---|---|---|---|
| P001 | Login Failed - could not dereference object | Login Manager | 20 |
| P002 | Config upload failure for devices in multi-homed machine | Configuration Manager -> Upload Config | 10 |
| P003 | Config upload failing for SSH enabled devices in specific image version | Configuration Manager -> Upload Config | 5 |
| P004 | Config upload failing for 15 chars wide IP addresses | Configuration Manager -> Upload Config | 7 |
| ... | ... | ... | ... |

FIG. 2  200

SOFTWARE SUSTAINING SYSTEM

BACKGROUND

1. Field

Embodiments of the invention relate to a software application that automatically detects, troubleshoots, and takes corrective action against problems in the software application.

2. Background

Until a specific version of a software application product, or simply, software product, reaches its End of Service (EOS), it generally will be supported and maintained by the manufacturer or vendor of the software product. During this maintenance period, a number of product defects, configuration issues, environment-specific issues, and invalid use cases, are identified through various customer or end-user feedback or escalations, and through internal (manufacturer) testing. An escalation occurs when a user notices a problem in a software product, and perhaps after trying to solve the problem themselves, raises the issue by contacting the customer service/software support team maintained by the vendor of the software product. If the problem is not resolved by the software support team, they may, in turn, refer the problem to a software maintenance team to fix. The software maintenance team may troubleshoot the problem and apply a software patch, or modification, to the software product, and may even involve the software development team to help fix the problem. In this manner, the problem is "escalated" up the chain of expertise at the customer site and/or the vendor's company until the problem is resolved.

In any case, once identified, these issues are referred to as "known issues" of or related to the specific version of the software product. It is often the case that a large number of customer escalations are raised because of these known issues. Such issues can be confirmed by observing a set of symptoms in the execution of the software product, and can be resolved by providing the corresponding fixes or workarounds, for example, in the form of a software update or patch, known to address the issues. Since there is no mechanism in the software product to automatically identify issues and handle them, the software product's vendor or the vendor's agents may undertake significant customer service and software engineering efforts in the problem troubleshooting process. These efforts may lead to significant costs for the vendor in servicing the software product over the software product's maintenance life cycle. Additionally, for complex problems such as performance and reliability issues, continuous monitoring of the software products in operation and periodically collecting debug information is necessary. Such activities require much effort and time not only of the vendor, but of the customer as well.

There are a number of approaches to troubleshooting and fixing problems in a software product, each with their own drawbacks. Vendors often use "release notes" which, at the time of the release of a specific version of a software product, document the then known set of issues and limitations for the product. The drawback, as indicated, is the release notes only capture the known issues identified at the time of the release of the software product. A user needs to manually check the release notes to confirm whether an issue or problem detected in the software product is a known issue. Additionally, the user will not be aware of the latest set of known issues, those detected and documented after the date the release notes were published, possibly requiring the user to raise service requests to the vendor to initiate troubleshooting and a remedy.

Another approach is for the vendor to document, in a question and answer format, often referred to as Frequently Asked Questions (FAQs), known issues and ways to resolve them. Other information repository tools may also be used to capture and store such information. The drawback with such an approach is that the information sometimes is available only to the vendor's software support team for the product, and may not be exposed to the user. For example, it may be that some or all of the information is not exposed to the user for various reasons such as marketing factors, perceived or actual lack of user's expertise in troubleshooting, and complexity of executing debugging tools and enacting steps to resolve the issue. On balance, this approach requires considerable amount of time and effort of the vendor's software engineering and customer service support staff There are third party applications that track known problems in software products as well. For example, some product vendors maintain an online repository of known bugs in the Java™ software product where a user can search for a problem description, version and other details. The repository does not provide an automatic troubleshooting approach, however. A user must manually search the repository using appropriate keywords. It is often difficult to confirm whether the user-encountered issue is exactly the same as the bug identified in the repository. Further the repository maintains only the list of bugs in the product; it does not address environmental issues, configuration issues or other invalid use cases the user may be experiencing.

There are some help and support tools built into software products, for example, the help and support tool in Microsoft's Windows operating system and Office software products. This tool is capable of performing as set of debugging steps corresponding to a specific problem by means of a wizard. In a recent version of Microsoft Windows, whenever an error occurs, the software product asks the user's permission to send a report of the error to Microsoft software support. While it is helpful for the software product to send reports on errors, it may be better in some situations to troubleshoot and report logical or functional issues in the software product. However, such issues are common in complex software applications like networking and network management software products. Thus, software product troubleshooting still requires involving a customer service/software support team.

Most software vendors employ the traditional software sustaining process, in which whenever users encounter any issues, they submit service requests to the software vendor. The vendor's customer service/software support team typically can answer simple or moderately complicated software support issues. But some moderately complicated, and most complex, issues require execution of equally complex troubleshooting steps to confirm whether the issue is a known issue or a new issue. In any case, such issues require the help of a software sustaining or maintenance team, and sometimes the software product's development team. Such cases involve complicated and time consuming chain of communication threads between the customer, the customer service team, the software sustaining or maintenance team, and the software development team. What is needed is a way to automate this process.

SUMMARY

A method and apparatus to automatically detect and analyze a problem in a software product and automatically correct the same. The method and apparatus comprises detecting a problem with the software product, capturing corresponding debugging information, and searching for known issues that match the detected problem to identify a root cause. In one embodiment of the invention, if the detected problem is a known issue, a corresponding solution is applied to the detected problem. If the detected problem is not a known issue, user input describing an occurrence of the problem is analyzed, as is captured debugging information. Based on the analysis, the repository of known issues is updated to include the detected problem as a new known issue and a corresponding solution to the detected problem.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
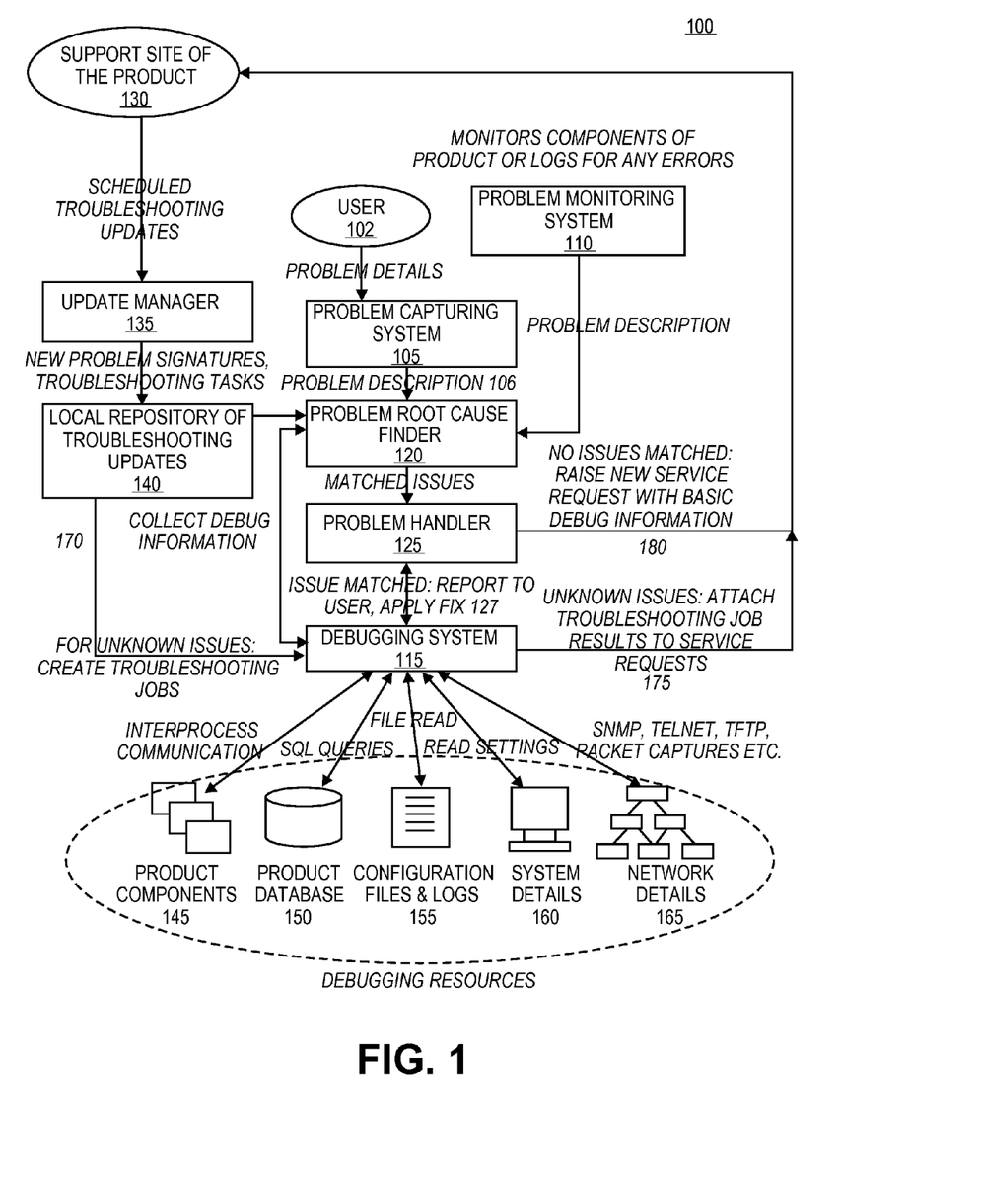
FIG. 1 is a block diagram of one embodiment of the invention.

With reference to FIG. 1, one embodiment of the invention 100 relates to making a software product automatically aware of the set of known issues corresponding to its version by periodically updating its local repository with new problem signatures and troubleshooting task signatures for detecting and troubleshooting software product issues, and executing corrective actions for the identified issues, thereby automating the software sustaining process.

In accordance with an embodiment of the invention, the automatic software sustaining system acts as a part of the software product itself which does self detection and correction of known issues. In the case of new issues, one embodiment effectively collects the debug information with the help of troubleshooting tasks. In one embodiment, the software product periodically gathers new troubleshooting information updates and detects and corrects the issues in the software product based thereon.

One embodiment of the invention comprises the following functional components: a problem capturing system 105 to capture a problem description and other user inputs related to the problem "on demand" from the user 102; a problem monitoring system 110 to automatically detect problems by continuously monitoring components of the software product or periodically scanning the log files and audit files/database associated with the software product for any occurrence of errors; a debugging system 115 to gather a set of debug information, log file information, and environment details related to the problem; a problem root cause finder 120 to compare a user detected issue with a set of known issues corresponding to the specific version of the software product and to identify the root cause of the problem; a problem handler 125 that, if the issue is already a known issue, reports to the user the nature of the issue and applies a fix/workaround based on user inputs, or if the user detected issue is a new issue, collects and packages the debug information received from debugging system 115, which may then be passed on to the vendor's customer service/software support team 130 for further analysis; an update manager 135 to schedule periodic troubleshooting information updates or "on demand" updates in order to refresh the local troubleshooting information repository 140 with the latest problem signatures and troubleshooting task signatures; and, the local troubleshooting information repository 140 that provides troubleshooting information updates, and which contains the signatures of known issues applicable to the current product version, along with their symptoms and corrective actions, as well as troubleshooting task signatures. Each of these functional components will now be described in further detail below.

The problem capturing system 105 gathers information about a problem such as a description of the problem and the circumstances causing the problem. In one embodiment, the above information is captured by a user invoking this system immediately upon occurrence of an issue, in what is known as a context-based information gathering approach. In the case of web-based applications, a launch point for this component may be a graphical user interface menu item of the product, for example, Menu→Debug→"Troubleshoot issue in current page"→gather user inputs. Conversely, the problem capturing system 105 may be invoked separately to directly receive the inputs (such as problem description/keywords, affected module/feature name of the product, input values such as a device's IP address, etc) from the user.

In one embodiment of the invention, a problem monitoring system 110 continuously monitors the error conditions occurring during the execution of the software product. It is common for software products to print error messages in log files ("logs") and/or persist the logs or errors in a database. Such functionality may be extended by having components of the software product that are experiencing a problem report error messages (as and when errors are encountered) to the problem monitoring system (i.e., a push-based approach). Thus, error messages may be parsed, and troubleshooting may be performed proactively to determine the issues in the software product. Conversely the problem monitoring system may periodically (for example, in accordance with a schedule) search through the logs or audit databases (i.e., a pull-based approach) to determine whether the software product has encountered any problems. While the problem capturing system 105 invokes the troubleshooting process on-demand based on user 102 request, the problem monitoring system 110 automatically carries out troubleshooting whenever errors occur in the software product. The problem monitoring system 110 may be configurable as a continuous monitoring process or as a periodic monitoring process.

The debugging system 115 captures debugging information corresponding to a specific problem by executing a sequence of debug steps, as indicated in a problem signature. Examples for such debugging information include: current product version, patches applied to the software product, system status (e.g., operating system software/hardware platform specifications), other applications running in the system, health of the various processes running in the system, configuration information (for example, in the case of a Network Management System (NMS) application, network information, or device-related information such as image, device type, etc.). In one embodiment of the invention, debugging information may be gathered by communicating with other components of the product 145 via interprocess communications, a product database 150, system details from the computing machine 160 on which the software product is installed, a file system 155 of the computing machine (from which to collect logs and configuration information), network related products or devices 165 via Simple Network Management Protocol (SNMP), Telnet, Trivial File Transfer Protocol (TFTP), or the network by capturing packet data between the software product and network devices. The debugging system 115 is equipped with set of tools and libraries such as a Command Line Instruction (CLI) command executor, SNMP library, packet capture/HyperText Transfer Protocol (HTTP) or Uniform Resource Locator (URL) capture utilities, and other scripts in order to collect the aforesaid system and/or network details.

For issues which are not already identified as known issues, debug information related to such is collected from the user. In one embodiment of the invention, this information can be collected automatically without user or customer service/software support team intervention by specifying a task identifier of a relevant troubleshooting task signature in the local repository 140 and requesting the user to create a troubleshooting job at 170. At the completion of the troubleshooting job, the collected information may be sent at 175 to the customer service/software support team or automatically attached to the service request raised by the user.

The problem root cause finder 120 receives problem descriptions at 106, provided by user input at 102, from the problem capturing system 105 to search and identify the root cause of a problem with the software product. In one embodiment of the invention, the problem root cause finder uses normal keyword search techniques and context specific search techniques to search the local repository of troubleshooting information updates 140 to identify possible known issue(s) which could be the root cause of the issue the user is experiencing with the software product. In one embodiment of the invention, the matched possible known issues are sorted in descending order of their weight (weight of an issue may be calculated for example based on the number of times the issue is experienced in user installations of the software product), and output to the problem handler 125. For all the matched possible known issues, the problem handler 125 communicates at 127 with the debugging system 115 to gather any additional information needed to confirm the possible known issues as known issues. By comparing the gathered information with the major symptoms/conditions of the known issues, the problem handler identifies the problem (root cause) corresponding to the user's issue with the software product.

In one embodiment of the invention, if the matched possible known issues are significant in number, the debugging process can take considerable time. In such a case, a debug collection job may be launched which runs in the background, while the user continues to use the software product; the problem handler 125 waits in the background until the job is completed.

Once the problem root cause finder confirms a user's problem with a software product as a known issue, the problem handler component 125 reports the issue to the user at 127 and reports the possible workarounds/fix. In one embodiment of the invention, based on the user's approval, problem handler 125 performs the corrective actions to fix the problem. Problem handler 125 may also send a report of successful resolution of the problem to the customer service/software support team for the software product for documentation and for revising the "weight" value associated with the problem.

In one embodiment of the invention, if the problem root cause finder is unable to identify any known issues corresponding to the user's problem, the problem handler 125 collects basic information and log file information corresponding to the problem description and packages this information. Based on user's approval, as indicated at 180 in FIG. 1, the problem handler may also raise a new service request and attach the collected basic debug information. Resolution of the problem is then transferred to the customer service/software support team for further analysis.

In one embodiment, an update manager 135 updates the local repository 140 with the latest troubleshooting information. Troubleshooting information updates may be scheduled to happen periodically such as daily, weekly, monthly, etc, or triggered on-demand by the user. The software support team may periodically generate new troubleshooting information updates (with new known issues and their solutions and new troubleshooting task signatures), and also publish the updates on a software product support website.

The local repository of troubleshooting information updates 140 contains the set of all known issues (problem signatures) applicable to a specific version of the software product installed on the user's computing machine. In one embodiment, the local repository also contains the symptoms or conditions for the occurrence of those known issues along with the possible workarounds/fix to overcome those issues. Apart from the problem signatures, the local repository contains troubleshooting task signatures which may be used by the debugging system to collect debug information for troubleshooting new issues which are not already identified as known issues.

The following discussion considers the life cycle of a typical software product and its corresponding known issues. Assume a major software product release, version 1.0, with known issues=x at the time of the release, and a subsequent minor release version 1.0 SP1, in which a number, y, of the x issues are resolved, but some new issues (z) are applicable to this version. Thus, the known issues applicable to minor release version 1.0 SP1=x−y+z. The corresponding structure of a problem signature is as follows:

Problem_ID→Unique identification code of the problem;
Problem_description→Brief description of the problem;
Product_version→Product release and version information to which this problem applies;
Problem_category→Specifies the feature/module of the product to which the problem belongs;
Problem_context→Specific page in a wizard/User Interface (UI) or the scenario where this problem occurs;
Problem_type→Specifies whether this is an invalid use case or system/network configuration issue or a bug in the software product;
Weight→Calculated based on the number of times this issue has been identified in user installations of the software product;
Symptoms→Conditions required for this problem to occur (including error message patterns, system configurations, etc.);
Debug_information→Debugging information to be collected to confirm the problem;
Debug_steps→steps involved to collect the debug information;

Corrective_action→details about the fix/workaround for this problem; and

Corrective steps→steps involved to perform the corrective action.

The local repository 140 in which a problem signature adhering to the above described problem signature structure is maintained for each known problem may be a database where each row in the table represents a problem signature or the repository may be a simple eXtensible Markup Language (XML) file where each problem signature is represented as an XML tag. The corresponding structure of a troubleshooting task signature is as follows:

Task ID→Unique identification of the troubleshooting task;
Task description→Brief description of the troubleshooting task;
Debug_information→Debugging information to be collected;
Debug_steps→steps involved to collect the debug information:

| Troubleshoot_issue( ) |
|---|
| 1. problem_description <- gatherUserinputs( ) |
| 2. matched_known_issues <- searchInLocalRepository (problem_description) |
| 3. for each known_issue in matched_known_issues do |
| 4. begin |
| 5. debug_steps <- known_issue.getDebugSteps( ) |
| 6. debug_information <- gatherDebugInformation(debug_steps) |
| 7. symptoms <- known_issue.getSymptoms( ) |
| 8. if symptoms matches debug_information |
| 9. identified_issues.add(known_issue) |
| 10. end if |
| 11. end for |
| 12. if identified_issues is empty |
| 13. basic_debug_information <- gatherDebugInformation (problem_description) |
| 14. user_action <- getUserApproval( ) |
| 15. if user_action = RAISE_SERVICE_REQUEST then |
| 16. raiseServiceRequest(basic_debug_information) |
| 17. end if |
| 18. else |
| 19. report_user(identified_issues) |
| 20. user_action <- getUserApproval( ) |
| 21. if user_action= APPLY_FIX then |
| 22. applyCorrectiveAction(identified_issues) |
| 23. end if |
| 24. end if |

In one embodiment of the invention, troubleshooting jobs are created that will run in the background to periodically monitor the system resources and keep track of the activities performed in the software product. Correlation of this information assists in detecting and identifying the root cause of the performance and reliability issues.

Consider an example of a user encountering a problem in a network management application where a configuration upload from a network switch fails. Assume further three known issues related to this topic. The respective problem signatures are as follows:

Known Issue #1: Configuration upload fails in multi-homed server where IP address of the NMS server is not reachable from the network switch.

| Problem_Signature: |  |
|---|---|
| Problem_description: | Configuration upload fails in multi-homed server where IP address of the NMS server not reachable from the network switch |

| Problem_Signature: | |
|---|---|
| Product_version: | problem applicable from version X to version Y |
| Problem_category: | Upload Configuration |
| Problem_context: | Configuration Manager -> Upload Config |
| Problem_type: | Bug in product |
| Weight: | 10 |
| Symptoms: | a. NMS server installed in multi-homed machine, |
| | b. Server IP unreachable from the device |
| | c. Product version is between X and Y |
| Debug_information: | a. Check whether NMS server installed in multi-homed machine |
| |     Debug_steps: 1. execute "ipconfig /all" |
| |         2. grep output to determine server is a multi-homed machine |
| | b. Check server IP is unreachable from the device |
| |     Debug_steps: 1. execute telnet <device IP address> |
| |         2. execute ping <server IP address> |
| |         3. grep results to find reachability status |
| | c. Check product version is between X and Y |
| |     Debug_steps: 1. Interact with product and get Product version |
| |         2. Check current product version between X and Y |
| Corrective_action: | Fix available in product version Z |
| Corrective_steps: | Upgrade to product version Z |

Known Issue #2: Configuration upload fails for Secure Shell (SSH) enabled network switches running specific image version.

| Problem_Signature: | |
|---|---|
| Problem_description: | Configuration upload fails for SSH enabled switch running specific image version |
| Product_version: | problem applicable from version P to version Q |
| Problem_category: | Upload Configuration |
| Problem_context: | Configuration Manager -> Upload Config |
| Problem_type: | Bug in product |
| Weight: | 5 |
| Symptoms: | a. Switch running image version "m" |
| | b. SSH enabled on switch |
| | c. Product version is between P and Q |
| Debug_information: | a. Check whether switch running image version "m" |
| |     Debug_steps: 1. Connect to product database |
| |         2. Execute Structured Query Language (SQL) instruction to fetch image version of the device <device ip address> |
| | b. Check whether SSH enabled on switch |
| |     Debug_steps: 1. execute telnet <device IP address> |
| |         2. execute "show management" |
| |         3. grep output to determine SSH status |
| | c. Check product version is between P and Q |
| |     Debug_steps: 1. Interact with product and get Product version |
| |         2. Check current product version between P and Q |
| Corrective_action: | Fix available in product version R |
| Corrective_steps: | Upgrade to product version R |

Known Issue #3: Configuration upload failing for switches with 15 chars wide IP address.

| Problem_Signature: | |
|---|---|
| Problem_description: | Configuration upload failing for switches with 15 chars wide IP address |
| Product_version: | problem applicable from version S to version T |
| Problem_category: | Upload Configuration |
| Problem_context: | Configuration Manager -> Upload Config |
| Problem_type: | Bug in product |
| Weight: | 7 |

-continued

| Problem_Signature: | |
|---|---|
| Symptoms: | a. Switch with 15 chars wide IP address |
| | b. Product version is between S and T |
| Debug_information: | a. Check whether switch is managed with 15 chars wide IP address |
| |     Debug_steps:    1. Check the length of <device IP address> |
| | b. Check product version is between S and T |
| |     Debug_steps:    1. Interact with product and get product version |
| |                                   2. Check current product version between S and T |
| Corrective_action: | Fix available in product version U |
| Corrective_steps: | Upgrade to product version U |

Figure 2:
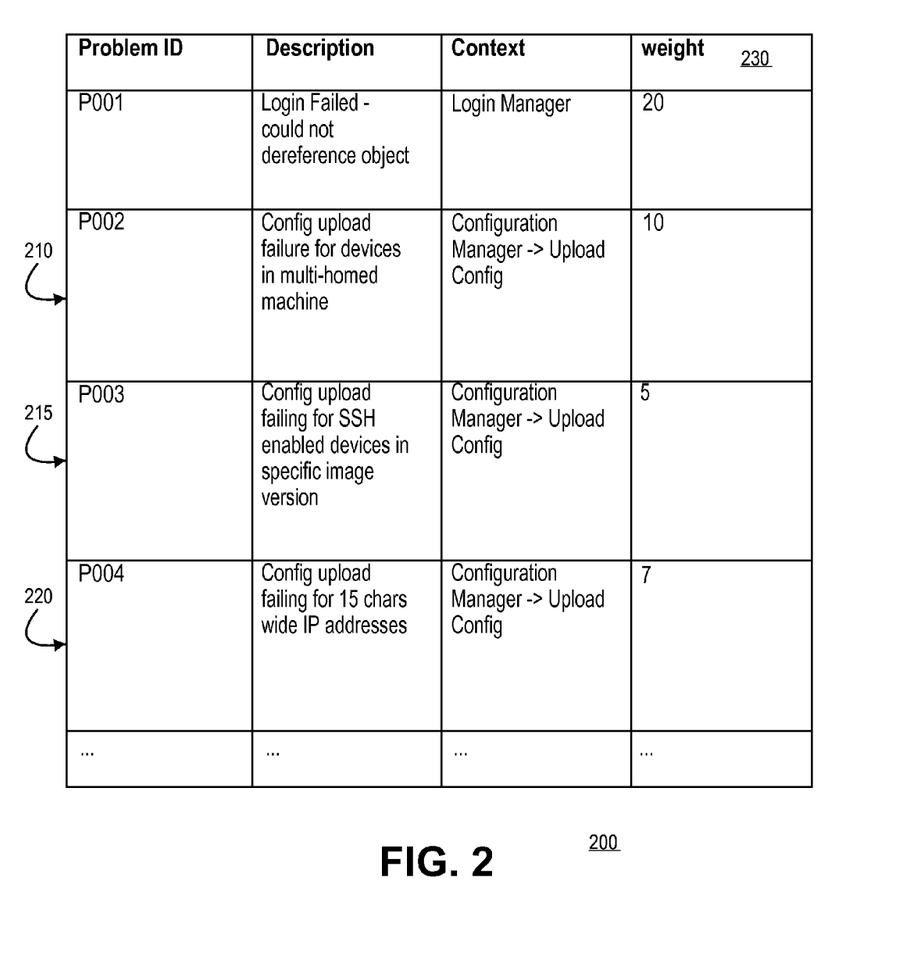
FIG. 2 is a table of problem signatures in accordance with one embodiment of the invention.

The table in FIG. 2 illustrates problem signatures downloaded to the local repository. The three known issues discussed above are set forth in the table—see P002 at 210, P003 at 215, and P004 at 220. A sample flow of execution follows, in which a user encounters a known problem:

a. User experiences a problem in configuration upload—configuration upload failing for a device.
b. User invokes troubleshooting system in accordance with one embodiment of the invention by selecting a context specific menu item in a page where the problem is encountered. In this example, the user may invoke a troubleshooter from the configuration manager component of the software product.
c. The problem capturing system 105 gathers the problem description and keywords from the user. In this case the user may enter the keywords "Configuration Upload Failed". A context sensitive and keyword search by the problem root cause finder 120 yields the available three known issues as mentioned above. Based on the decreasing order of their weights 230, the problems are sorted as P002, P004 then P003.
d. The problem root cause finder 120 communicates with the debugging system 115 to gather the debug information as specified in each of the known issues signatures as mentioned above, and compares the symptoms with the debug information and passes control to problem handler 125. Assume symptoms for P004 are matched (Device IP address is 15 chars wide).
e. The problem handler 125 reports the matched known issue P004 along with corresponding corrective actions. Based on user input, problem handler 125 applies the corrective action for P004 and based on user approval sends a report of such to the customer service/software support team, which then increments the weight for P004 from 7 to 8 in subsequent troubleshooting information updates.

Another sample flow of execution follows, in which a user encounters a new problem:

a. User experiences a problem in configuration upload—configuration upload failing for a device.
b. User invokes an embodiment of the invention by selecting the context specific menu item in the page where the problem is encountered. In this example, user invokes a troubleshooter from the configuration manager component of the software product.
c. The problem capturing system 105 gathers the problem description and keywords from the user. In this case the user may enter the keywords "Configuration Upload Failed". The context sensitive and keyword search yields the available three known issues as mentioned above. Based on the decreasing order of their weights, the problems are sorted as P002, P004 then P003.
d. The problem root cause finder 120 communicates with the debugging system 115 to gather the debug information as specified in each of the problem signatures as mentioned above and compares the symptoms with the debug information, then passes control to problem handler 125. Assume in this example that none of the symptoms are matched (that is, the user encounters a new issue).
e. Problem handler 125 raises a new service request with the information collected by the problem root cause finder 120.
f. Software support team 130 performs manual analysis on the collected log files. If more debug information is required, the team asks the user to run the debugging system with the given troubleshooting task ID. If the problem requires different debugging steps other than the published troubleshooting signatures, a new troubleshooting signature is created and published by the support team.
g. User then manually updates the troubleshooting repository and triggers the debugging process with the provided troubleshooting task ID. The collected information is then passed on to the software support team as an attachment to the service request raised for the new problem.
h. After the software support team completes the analysis and identifies the root cause, the new issue becomes a new known issue of the product (with weight=1) and its problem signature is published by the software support team.

Figure 3:
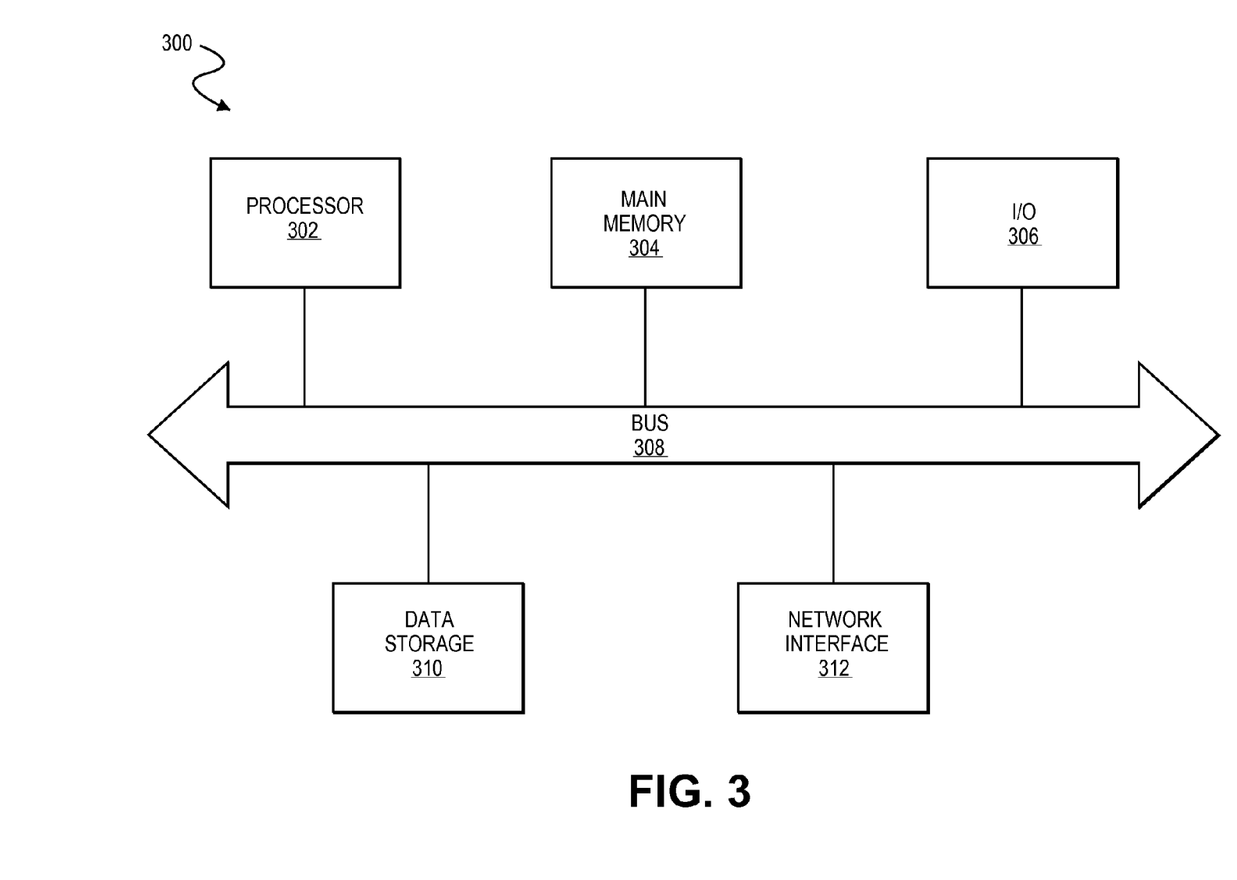
FIG. 3 is a block diagram of a computing system on which an embodiment of the invention may be carried out.

There are a number of advantages to the embodiments of the invention, including effectively capturing and storing the troubleshooting skills of the software support team and simplifying the software product sustaining process. There is no need to spend time and effort in handling service requests related to known issues of the software product. In case of new issues, embodiments of the invention collect required logs and other debug information thereby relieving the user and software support team from performing those tedious tasks. Additionally, troubleshooting of software performance issues require continuous monitoring and analysis of the system—with the help of an automated troubleshooting system as in the embodiments of the invention, this monitoring and analysis can be performed effectively and efficiently. Finally, it is appreciated that the approach described herein avoids human errors while collecting information or while validating problems with the software product, enhancing customer satisfaction for the product FIG. 3 illustrates one embodiment of a suitable computing environment in which certain aspects of the invention illustrated in FIGS. 1 and 2 may be practiced. One embodiment of the invention may be implemented on a computer system 300 having components 301-312, including a processor 302, a memory 304, an Input/Output device 306, a data storage 310, and a network interface 312, coupled to each other via a bus 308. The components perform their conventional functions known in the art and provide the means for implementing an embodiment of the invention. Collectively, these components represent a broad category of hardware systems, including but not limited to general purpose computer systems and specialized packet-forwarding devices.

In one embodiment, the memory component 304, may include one or more of random access memory (RAM), and nonvolatile storage devices (e.g., magnetic or optical disks) on which are stored instructions and data for use by processor 302, including the instructions and data that comprise components of the invention 100. In one embodiment, the network interface component 312 may include physical ports. The data storage component 310 may also include the locale repository 140.

It is to be appreciated that various components of computer system 300 may be rearranged, and that certain implementations of the present invention may not require nor include all of the above components. Furthermore, additional components may be included in system 300, such as additional processors (e.g., a digital signal processor), storage devices, memories, network/communication interfaces, etc.

In the illustrated embodiment of FIG. 3, one embodiment of the invention as discussed above may be implemented as a series of software routines executed by computer system 300. The software routines may comprise a plurality or series of instructions, code sequences, configuration information, or other data to be accessed and/or executed by a processing system such as one or more of processor 302. Initially, the series of instructions, code sequences, configuration information, or other data may be stored on a data storage 310 and transferred to memory 304 via bus 308. It is to be appreciated that the series of instructions, code sequences, configuration information, or other data can be stored a data storage 310 using any conventional computer-readable or machine-accessible storage medium, such as a diskette, CD-ROM, magnetic tape, DVD, ROM, etc. The instructions, code sequences, configuration information, or other data may be copied from the data storage 310, such as mass storage, and accessed and executed by processor 302.

In alternate embodiments, the present invention is implemented in discrete hardware or firmware. For example, one or more application specific integrated circuits (ASICs) could be programmed with some or all of the above-described functions of the present invention.

Accordingly, a novel software sustaining system is described. From the foregoing description, those skilled in the art will recognize that many other variations of the present invention are possible. Thus, the present invention is not limited by the details described. Instead, the present invention can be practiced with modifications and alterations within the spirit and scope of the appended claims.

What is claimed is:

1. A method comprising:
    detecting a problem with a software product;
    searching for a problem signature relating to the detected problem in a repository of a set of known issues corresponding to the software product to identify a sequence of debug steps to execute to capture debugging information corresponding to the detected problem, and to identify a root cause of the detected problem;
    capturing debugging information corresponding to the detected problem by executing the sequence of debug steps identified in the problem signature relating to the detected problem when the problem signature relating to the detected problem is found in the repository;
    capturing debugging information automatically from the software product when the problem signature relating to the detected problem is not found in the repository;
    indicating the detected problem is a known issue in the set of known issues corresponding to the software product, and automatically applying a corresponding solution to the detected problem, when the problem signature relating to the detected problem is found in the repository, and
    when the problem signature relating to the detected problem is not found in the repository indicating the detected problem is not a known issue in the set of known issues corresponding to the software product:
        providing as output user input describing an occurrence of the problem with the software product, and the debugging information captured automatically from the software product for analysis;
        updating the repository of the set of known issues to include a troubleshooting task signature comprising a troubleshooting task identifier, a troubleshooting task description, a description of debugging information to be collected, and a sequence of debugging steps to be performed to collect the debugging information to be collected, the troubleshooting task signature to be used by a debugging system to collect debugging information for troubleshooting the detected problem, responsive to the analysis;
        triggering debugging with the troubleshooting task identifier in response to the updating; and
        responsive to the triggering debugging, completing the analysis and updating the repository of the set of known issues to include a new problem signature relating to the detected problem as a new known issue and a corresponding solution to the detected problem.

2. The method of claim 1, wherein detecting the problem comprises receiving the user input describing an occurrence of the problem with the software product.

3. The method of claim 2, wherein detecting the problem further comprises receiving user input regarding circumstances associated with the occurrence of the problem with the software product.

4. The method of claim 1, wherein detecting the problem comprises automatically detecting the problem during execution of the software product.

5. The method of claim 1, wherein detecting the problem comprises reading information regarding the problem written to one or more of a log file, an audit file, and a database, associated with execution of the software product.

6. The method of claim 1, wherein the captured debugging information whether a problem signature is found or not found comprises one or more of a version of the software product, a software patch level associated with the software product, a status of a computing system on which the software product is executing, other software products executing on the computing system, configuration information associated with the software product or the computing system on which the software product is executing.

7. The method of claim 1, wherein searching for the problem signature relating to the detected problem comprises searching for the problem signature relating to the detected problem in the repository of a set of known issues corresponding to a specific version of the software product.

8. The method of claim 1, further comprising:
    when the problem signature relating to the detected problem is found in the repository:
        sorting the plurality of possible known issues by their respective weights, wherein the weight for a particular possible known issue in the plurality is based on a number of times the particular possible known issue has been reported as occurring in executions of the software product, and providing as output the sorted plurality of possible known issues;
        obtaining additional information as may be needed to identify one of the plurality of possible known issues as the detected problem, starting with the particular possible known issue having the greatest weight and repeating obtaining the additional information until one of the plurality of possible known issues is identified.

9. The method of claim 1, wherein when the problem signature relating to the detected problem is found in the repository, further comprising:

providing output describing the detected problem;
providing output describing the corresponding solution to the detected problem; and
wherein automatically applying a corresponding solution to the detected problem comprises applying the corresponding solution based on input providing approval to apply the corresponding solution,
providing as output resolution of the detected problem by application of the corresponding solution to a vendor of the software product,
and adjusting the weight of the known issue corresponding to the detected problem.

10. The method of claim 1, wherein, when the problem signature relating to the detected problem is not found in the repository indicating the detected problem is not a known issue in the set of known issues corresponding to the software product, updating the repository of the set of known issues to include the new problem signature relating to the detected problem as a new known issue comprises including a description of one or more symptoms associated with the detected problem, and a description of one or more conditions associated with the occurrence of the detected problem.

11. A non-transitory machine-readable storage medium that provides instructions that, if executed by a processor, will cause said processor to:
detect a problem with a software product;
search for a problem signature relating to the detected problem in a repository of a set of known issues corresponding to the software product to identify a sequence of debug steps to execute to capture debugging information corresponding to the detected problem, and to identify a root cause of the detected problem;
capture debugging information corresponding to the detected problem by executing the sequence of debug steps identified in the problem signature relating to the detected problem when the problem signature relating to the detected problem is found in the repository;
capture debugging information automatically from the software product when the problem signature relating to the detected problem is not found in the repository;
indicate the detected problem is a known issue in the set of known issues corresponding to the software product, and automatically apply a corresponding solution to the detected problem when the problem signature relating to the detected problem is found in the repository, and,
when the problem signature relating to the detected problem is not found in the repository indicating the detected problem is not a known issue in the set of known issues corresponding to the software product,
provide as output user input describing an occurrence of the problem with the software product;
provide as output the debugging information captured automatically from the software product, for analysis;
update the repository of the set of known issues to include a troubleshooting task signature comprising a troubleshooting task identifier, a troubleshooting task description, a description of debugging information to be collected, and a sequence of debugging steps to be performed to collect the debugging information to be collected, the troubleshooting task signature to be used by a debugging system to collect debugging information for troubleshooting the detected problem, responsive to the analysis;
trigger debugging with the troubleshooting task identifier in response to the update; and
responsive to the triggered debugging, complete the analysis and update the repository of the set of known issues to include a new problem signature relating to the detected problem as a new known issue and a corresponding solution to the detected problem.

12. The non-transitory machine-readable storage medium of claim 11, wherein to detect the problem comprises to receive user input describing an occurrence of the problem with the software product.

13. The non-transitory machine-readable storage medium of claim 12, wherein to detect the problem further comprises to receive user input regarding circumstances associated with the occurrence of the problem with the software product.

14. The non-transitory machine-readable storage medium of claim 11, wherein to detect the problem comprises to automatically detect the problem during execution of the software product.

15. The non-transitory machine-readable storage medium of claim 11, wherein to detect the problem comprises to read information regarding the problem written to one or more of a log file, an audit file, and a database, associated with execution of the software product.

16. The non-transitory machine-readable storage medium of claim 11, wherein the captured debugging information, whether a problem signature is found or not found, comprises one or more of a version of the software product, a software patch level associated with the software product, a status of a computing system on which the software product is executing, other software products executing on the computing system, configuration information associated with the software product or the computing system on which the software product is executing.

17. The non-transitory machine-readable storage medium of claim 11, wherein to search for the problem signature relating to the detected problem in a repository of a set of known issues corresponding to the software product comprises to search for the problem signature relating to the detected problem in the repository of a set of known issues corresponding to a specific version of the software product.

18. The non-transitory machine-readable storage medium of claim 11, further comprising:
when the problem signature relating to the detected problem is one of a plurality of possible known issues in the set of known issues:
sort the plurality of possible known issues by their respective weights, wherein the weight for a particular possible known issue in the plurality is based on a number of times the particular possible known issue has been reported as occurring in executions of the software product, and provide as output the sorted plurality of possible known issues;
additional information as may be needed to identify one of the plurality of possible known issues as the detected problem, starting with the particular possible known issue having the greatest weight and repeating obtaining the additional information until one of the plurality of possible known issues is identified.

19. The non-transitory machine-readable storage medium of claim 11, wherein when the problem signature relating to the detected problem is found in the repository indicating the detected problem is a known issue in the set of known issues corresponding to the software product, further comprising:
output a description of, and the corresponding solution to, the detected problem; and
wherein to automatically apply a corresponding solution to the detected problem comprises applying the corresponding solution based on user input providing approval to apply the corresponding solution, to output resolution of the detected problem by application of the corresponding solution to a vendor of the software product, and adjust the weight of the known issue corresponding to the detected problem.

20. The non-transitory machine-readable storage medium of claim 11, wherein, when the problem signature relating to the detected problem is not found in the repository indicating the detected problem is not a known issue in the set of known issues comprises when the detected problem is not a known issue in the set of known issues corresponding to the software product, to update the repository of the set of known issues to include the problem signature relating to detected problem as a new known issue, including a description of one or more symptoms associated with the detected problem, and a description of one or more conditions associated with the occurrence of the detected problem.

* * * * *